UNITED STATES PATENT OFFICE.

THOMAS S. NOWELL, OF BOSTON, MASSACHUSETTS, ASSIGNOR TO THE AVERY LACTATE COMPANY, OF PORTSMOUTH, NEW HAMPSHIRE.

TONIC BASE FOR AERATED BEVERAGES.

SPECIFICATION forming part of Letters Patent No. 346,824, dated August 3, 1886.

Application filed May 14, 1885. Serial No. 165,477. (No specimens.)

*To all whom it may concern:*

Be it known that I, THOMAS S. NOWELL, of Boston, in the county of Suffolk and State of Massachusetts, have invented a certain new and useful Aerated and other Beverage Tonic Base, of which the following is a specification.

My invention relates to the production of an acid base for aerated and other beverages and tonics, which may be used by druggists in connection with soda-water fountains, as well as by physicians in preparing a cooling acid drink, and by the public generally.

It consists of lactic acid containing from one to two per centum of lactate of lime, with traces (less than one-fourth of one per centum each) of vegetable gluten, vegetable coloring-matter, gum, and sulphate of lime, combined with water and sugar or plain sirups, to which may be added any desired fruit sirup, in any particular case. The lactate of lime serves to take off the sharp edge of a chemically pure lactic acid, and the gluten, gum, &c., named serve to give it a distinctive color and odor, and, as they are present in such minute quantities, are incapable of doing any injury to the human stomach, and at the same time render the acid more palatable than pure acid would be.

In ordinary use this base may be used after the manner of acid phosphate, or it may be combined with various ingredients—such as bitters, flavoring-sirups, liquors, &c., and will be found not only harmless but beneficial, and extremely palatable, being particularly well adapted for all aerated beverages.

I claim as my invention—

An acid base for aerated and other beverages and tonics, consisting of lactic acid containing one to two per centum of lactate of lime, and traces of vegetable gluten, vegetable coloring-matter, gum, and sulphate of lime, with water and sugar or sirups, substantially as set forth.

In testimony whereof I have signed my name to this specification, in the presence of two subscribing witnesses, this 23d day of April, 1885.

THOMAS S. NOWELL.

Witnesses:
C. F. BROWN,
A. L. WHITE.